United States Patent [19]

Starr

[11] Patent Number: 4,503,012

[45] Date of Patent: Mar. 5, 1985

[54] REAGENT DISPENSING SYSTEM

[75] Inventor: Maurice Starr, Indianapolis, Ind.

[73] Assignee: American Monitor Corporation, Indianapolis, Ind.

[21] Appl. No.: 486,330

[22] Filed: Apr. 19, 1983

[51] Int. Cl.[3] .................... G01N 1/14

[52] U.S. Cl. .................... 422/100; 222/386.5; 222/442; 422/63; 436/180

[58] Field of Search .................... 422/81, 100, 80; 417/394; 222/632, 642, 386.5, 95, 442; 436/52, 180

[56] References Cited

U.S. PATENT DOCUMENTS

| | | | |
|---|---|---|---|
| 3,180,527 | 4/1965 | Wasilewski et al. | 222/642 |
| 3,199,511 | 8/1965 | Kulick | 222/95 |
| 3,827,304 | 8/1974 | D'Autry | 422/100 |
| 3,929,411 | 12/1975 | Takano et al. | 23/259 |

*Primary Examiner*—Barry S. Richman
*Assistant Examiner*—Joseph P. Carrier
*Attorney, Agent, or Firm*—Robert A. Spray; Marilyn Amick

[57] ABSTRACT

Liquid-transfer equipment as for dispensing liquid reagents for chemical assays, which provides time-controlled metering of the quantity of liquid dispensed even though the liquid supply reservoir is not pressurized.

15 Claims, 5 Drawing Figures

REAGENT DISPENSING SYSTEM

The present invention relates to liquid-transfer equipment, and more particularly that of the supplying of reagents in liquid form to equipment by which assays of various specimens are made by the use of reagent liquids.

For many years, assays in the field of chemical and biological assays, as well as other types of liquid-testing or other liquid-handling procedures, have utilized a step of adding small portions of a reagent or other particular liquid to other liquids being processed in some manner; and in many of these instances, including that of adding a portion of a reagent liquid to liquid specimens being analyzed or assayed, it is desired to add only a small and metered amount of the liquid or reagent being added.

With reference particularly to the field of chemical and biological assays, and more particularly to those of approximately the last thirty years in which various types of automated or semiautomated analyzers have been used for such assays, different types of reagent-adding means have been used.

Illustrative of the variety of reagent-additive means are the following:

(a) In the U.S. Pat. No. 2,899,280 of Whitehead et al., a pressure device having a peristaltic pumping action is employed. The amount or proportion of each reagent which is added is dependent upon the diameter of the tubes in the peristaltic pump; but this is disadvantageous in that the tubes must be changed in order to change the proportions or amount of reagents added to a particular test.

(b) In the U.S. Pat. No. 3,012,863 of Feichtmeir, a pressure device is used which is similar to a syringe, it displacing the reagent into a reaction vessel by a pumping stroke effect. Even though they may be accurate, they must be mechanically adjusted to change as to volume of the reagent dispensed, and it is difficult to cleanse such a device when changing to a different reagent.

(c) Pressurized reagent supply is also shown in the Durkos et al U.S. Pat. No. 3,901,656.

In addition to disadvantages as noted above for pressurized reagent-supply methods, it has been discovered that the pressure method creates other problems. More particularly it has been found that volumetric accuracy is impaired by pressure systems, and this causes a corresponding inaccuracy of certain assays whose accuracy is dependent upon accuracy of the volume of reagent added.

That is, it has been found that absorbence of the pressurizing gas, e.g., air or carbon dioxide, being dependent upon pressure, results in some of the gas being absorbed by the liquid when in the pressurized dispensing lines of pressurized dispensing, but then causes the gas precipitating out of solution when the pressure on the reagent liquid is reduced, as it is when the reagent has passed from its dispensing lines to a reaction vessel used in the assay; and the presence of bubbles in the solution can cause significant problems in certain observation procedures of the assay such as when using photometric procedures.

Moreover, the pressurizing gas itself would render many tests quite inaccurate, for the pressure causes greater absorbence of the gas, and the extra gas (such as $CO_2$ from the air) would be misread as a component of the specimen being assayed.

Another disadvantage of pressurized supply source in liquid-dispensing apparatus is that extra wall strength is required for containers under pressure. Better utilization of storage space of the enclosure housings of automated equipment is thus achievable, considering both size and shape, if the reagent supply containers are not of pressurized type.

Moreover, any leakage of pressure of a reagent-dispensing system, which is dependent upon pressure for accuracy of the amount of reagent dispensed, is of course quite detrimental; and some leakages are especially difficult to avoid if the supply chambers of the reagents being dispensed are of pressurized type, for reagents have to be added or replaced frequently, and their 100% sealing in every instance is of course difficult to assure. Non-pressurized supply source dispensing, as by the present invention, avoids those problems; for only a portion of the dispensing conduit is pressurized, and that portion is not one requiring such handling.

Further, pressurized reagent-supply systems inherently require the bother of an extra step of venting when changing to the dispensing of a different reagent. Also, by a non-pressurized supply source, reagents may be added even during operation of the equipment.

Also, a disadvantage of pressurized reagent systems is the fact that there are differences of the effect of any certain amount of pressure as dependent upon the height or head of liquid above its outlet.

Any single one of the disadvantages may in many cases not be itself of critical nature, and may even be overcome or avoided by other factors of the equipment or of the assay; but, considering the desire of extreme accuracy of many assays, the desire for rapid and fully-effective changeover from one type assay reagent to another, the desire for compactness of space-requirements in automated assay equipment, the desire to avoid extra time of tests, the desire for a large number of different reagents usable in assays, the desire for rapidity of tests, etc., it has been found that metered reagent dispensing by pressure is undesired in many instances.

Non-pressure methods of reagent supply have been used, but apparently in only the slow and undesirable manual procedures such as the drawing of reagent liquid into a calibrated pipette tube, with a manual procedure of temporarily venting the tube to allow liquid to run out until it is of only a certain volume.

In carrying out the invention in a desired embodiment, there is provided an advantageous liquid-transfer system, such as for dispensing metered amounts of liquid reagent in a chemical assay procedure; and the liquid supply is not pressurized but is kept open to atmospheric pressure. A liquid-inlet line leads from the liquid supply chamber but branches into two lines, one of which leads to a pumping chamber and a second one of which leads to a valve in a dispenser outlet means.

A pumping means including a deformable bladder means is mounted in a housing, and the other side of the bladder means is open to and is controlled as to pressure by an actuation air means which leads from an external source of air under pressure, for achieving a pumping actuation of the bladder.

Associated control means, for both the valve in the dispenser line and in the actuation air means, cause a pumping operativity of the bladder for the desired dispensing of metered amounts of the reagent liquid, by controlling the length of time interval which the valve in the dispenser line is open from the pumping chamber to the dispenser outlet means. The metered amount of reagent liquids is accordingly a function of time, a relatively easily and precisely controllable factor; and the control for the dispenser line valve and for the air actuation means is co-ordinated such that the time interval, during which there is open communication between the pumping chamber and the dispenser outlet means, occurs entirely during a longer time interval during which the pumping chamber is under pressure of actuating air, this providing and assuring, at any given pressure, that amount of liquid dispensed is a function of time even though the supply chamber is of non-pressurized nature.

Desirably, as in both embodiments, the bladder is of a generally-tubular shape; and the housing body, in which the bladder is mounted, also provides an outer wall to which the bladder is sealingly connected, the wall of the housing body and the said other side of the bladder means providing a sealed chamber whose pressure variations achieve the pumping actuation of the bladder and whose pressure is dependent upon the actuation air means.

The dispenser line valve is a two-way valve means which in one setting provides a communication from the pumping chamber to the dispenser outlet but in another setting such communication is blocked; and the air actuation means includes a three-way valve, which in one setting opens to vent the pressure against the under side of the bladder, but blocks venting of the line leading from the external air pressure source, and in a second setting opens communication between the associated source of compressed air and the under side of the bladder, but blocks any venting from either line.

Accordingly, the pumping actuation is achieved, precisely governed as to amount of reagent liquid dispensed, solely as a function of time, at any given pressure, even though it uses a non-pressurized supply source, and attains the advantages of a non-pressurized supply source.

The above description is of somewhat introductory and generalized form. More particular details, concepts, and features are set forth in the following and more detailed description of two illustrative embodiments, taken in conjunction with the accompanying drawings, which are of somewhat schematic and diagrammatic nature, and in which:

FIGS. 1, 2, and 3 are sequential views in use of a reagent dispensing system according to an embodiment of the invention. In such views:

The concepts of the present invention provide an advantageous reagent-dispensing system; and by use of this system in any of its embodiments, the user may transfer a pre-determined or optionally-selected amount of fluid 10 from a supply tank 12 to a container which may be a reaction tube or other vessel 13. The components and concepts of the system will be specifically described in connection with their roles in the dispensing system.

Figure 1:
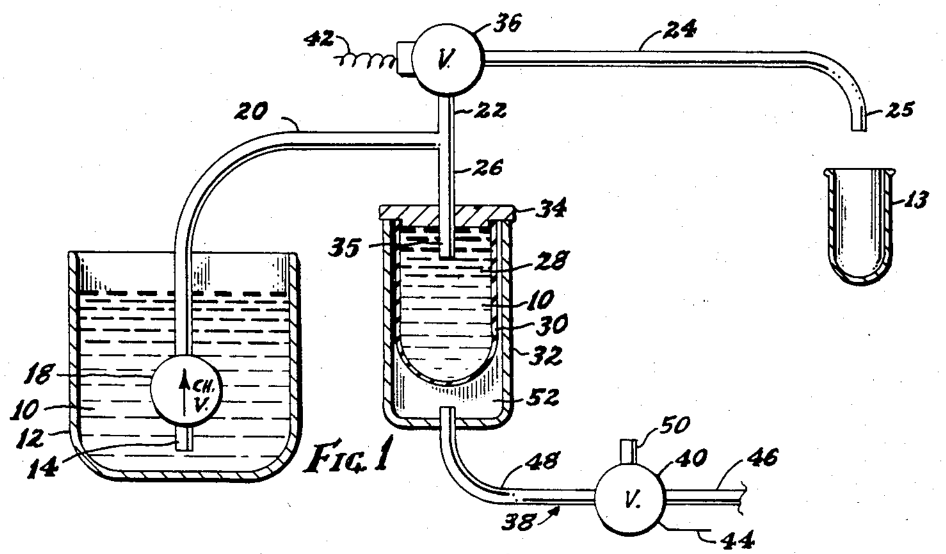
FIG. 1 illustrates the components at an initial stage.
Figure 2:
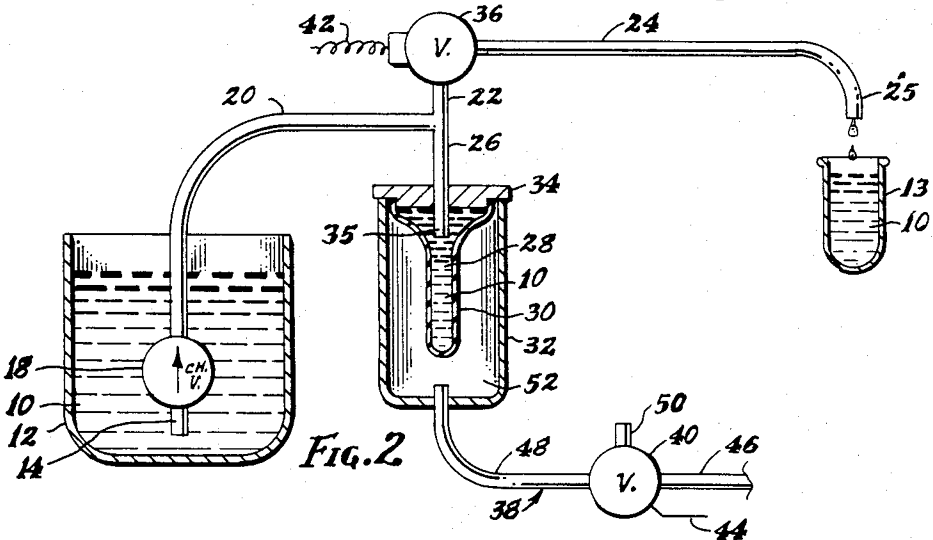
FIG. 2 illustrates the components at a second stage.
Figure 3:
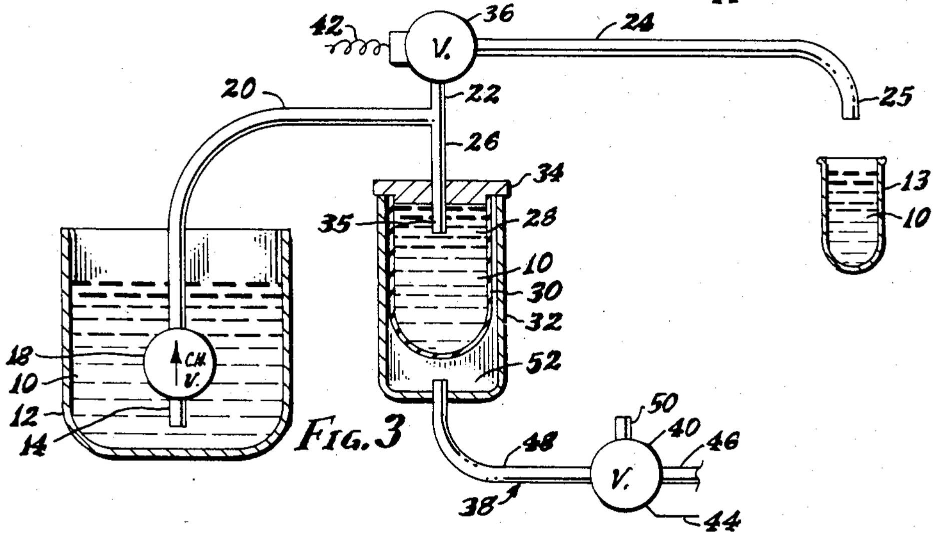
FIG. 3 illustrates the components at a still-later stage, although ready to start again the cycle beginning with FIG. 1.

More particularly, the system as shown in FIGS. 1–3 comprises a supply tank 12 into which is disposed the inlet end 14 of piping 20 having a check valve 18, and leading to piping-sections 20, 22, and 24, for fluid transfer from the supply tank or chamber 12, which as shown is open to atmospheric pressure, through the dispenser components described herein to an outlet 25 of outlet line 24, to the associated container 13 which is to receive a metered quantity of the reagent liquid.

The piping section 22 has a downwardly-extending branch line 26 which opens to a pumping chamber shown as an upper chamber 28 of a generally tubular-shaped bladder 30. The bladder 30 is shown as sealingly mounted in a bladder housing 32 which is sealingly covered by a cap 34, the piping branch 26 extending through the cap 34 in a sealed relationship and ending in an open-ended section 35. There is shown a solenoid-operated two-way valve 36 between piping portions 22 and 24, operative as shown below.

Air line 38 leads from a pressurized air source (not shown), and contains a three-way valve 40, operative as herein specified; and the air line 38 is supplied with air at a desired pressure, conveniently 15 p.s.i., from the external source.

The two-way solenoid operated valve 36 and the three-way valve 40 are operated also from an associated or external control system (schematically shown by wires 42 connected to the solenoid valve 36, and a control line 44 connected to the three-way valve 40), but details of such controls are not part of the inventive concepts of the system.

FIGS. 1, 2, and 3 are sequential views, showing the cycle of operations to transfer the fluid 10 from supply tank 12 to container 13. At the initial position of the components, as shown in FIG. 1, the bladder 30 is shown full of fluid 10. (Bladder 30 is assumed to have become filled with fluid 10 by the operation of the system through several cycles of operation; but in explaining the operation, for ease of understanding the initial stage of the illustrated sequence is presented as with the bladder filled.) Once the bladder 30 is initially filled, the operative cycle as described herein may begin.

In FIG. 1, the three-way air valve 40 is open, permitting air to flow in line 38 from the external pressure source (not shown), through a first air line-portion 46, past the air valve 40 and into a second line-portion 48. At this time or stage of actuation, the three-way valve exhaust port 50 of valve 40, however, is closed so as not to let the air pressure escape from lines 46 and 48.

The air from line-portion 48 of the line 38 flows into the bladder housing 32 to a portion 52 beneath the bladder 30 and not in communication with the bladder chamber 28; and the air incoming through line-portion 48 does not leave chamber 52 because the bladder housing 32 and its cap 34 form an air-tight seal.

Since the air is thus trapped in the housing 32 and particularly in chamber 52 beneath the bladder 30, air pressure builds up to the 15 p.s.i. supply pressure. The underside of the bladder 30 inside the bladder housing 32 is thus exposed to the 15 p.s.i. pressure.

The bladder 30 is not a rigid member, and would collapse under this pressure, except for the fact that in order to collapse, the lines 20, 26, and 22 being full of liquid, the bladder 30 would have to displace the fluid 10 inside the upper bladder chamber 28; however the fluid 10 in the upper bladder chamber 28 cannot be displaced into line 26, since then the two-way valve 36 is closed, preventing movement of fluid through line-portion 22, and the check valve 18 allows flow in line 20 only in the direction opposite from that which is incident to movement of fluid out the upper bladder-chamber 28.

Therefore, in such a stage and time, the portions of fluid 10 in the upper bladder chamber 28 and in lines 20 and 22 are also under 15 p.s.i. pressure, opposing the 15 p.s.i. pressure exerted by the air pressure in the housing 32 in its chamber 52 between the bladder 30 and bladder housing 32; and, accordingly, at that time and stage of operation, a state of static equilibrium exists.

FIG. 2 shows the next step in the cycle, which is the opening of the solenoid-operated two-way valve 36 by control line 42. When valve 36 is opened, intercommunicating the dispenser lines 22 and 24, the pressure differential between lines 22 and 24 (line 24 being open to atmosphere in the region of the container 13) causes the fluid in line 22 to flow through valve 36 into line 24. As that flow occurs, i.e., the flow of fluid in line 22 flowing into line 24, the fluid 10 in the upper bladder chamber 28 flows into line 22 since there is still 15 p.s.i. pressure in lower housing chamber 52 between the bladder 30 and the bladder housing 32.

As the fluid is squeezed out of the upper bladder chamber 28, the bladder 30 collapses, and the fluid flows from the upper bladder chamber 28, through lines 26 and 22, then through open valve 36, and through line 24 out outlet 25 into the container 13.

The amount of fluid that will flow through line 24 into container 13 thus will be seen to depend on a time factor, i.e., how long the valve 36 remains open, assuming, of course, that sufficient fluid is available in the upper bladder chamber 28 for the metered amount of reagent dispensate desired. Regardless of the means of timing control of the valve 36, the amount of fluid transfered or dispensed is a function of time, at any given pressure.

When the desired amount of fluid is thus transfered for the desired amount of reagent delivered to the vessel 13, the control 42 will cause the valve 36 to close; and this prevents further reagent fluid flow into outlet line 24 and into the container 13.

FIG. 3, as a still subsequent sequential showing, shows the last step in the cycle of operation. That is, after valve 36 closes as just described, the three-way air valve 40 is caused by its control 44 to open the communication of the exhaust port 50 of air valve 40 to line portion 48, and closes off first line-portion 46.

At this time, the 15 p.s.i. pressure existing in housing chamber 52, between the bladder 30 and bladder housing 32, causes the air to flow from inside that chamber 52 of the bladder housing 32, through portion 48 of line 38 and valve 40, until the pressure returns to zero (gauge, of course) in lower bladder chamber 52 and line-portion 48.

When the pressure on both sides of the bladder 30, i.e., in both the upper bladder chamber 28 and the lower bladder chamber 52, has no differential, both then being zero gauge pressure, the bladder 30 returns to its original shape, quite similarly to the action of the rubber tip of a medicine dropper returning to its shape after releasing pressure from the previously applied pinch of the user's fingers.

As the bladder 30 returns to its original shape, as shown in FIG. 3, however, its increasing of volume of the upper bladder chamber 28 tends to create a vacuum in that upper bladder chamber 28; and consequently more fluid 10 from the supply tank 12 flows, by the atmospheric pressure in supply tank 12, through the check valve 18, then through lines 20 and 26, and into the upper bladder chamber 28, until there is equalized the pressure on both sides of check valve 18.

At this time or stage, the upper bladder chamber 28 is again filled and waiting for the three-way air valve 40 to open to connect lines 48 and 46 and start the cycle again, as per the stage at the showing of FIG. 1.

Figure 4:
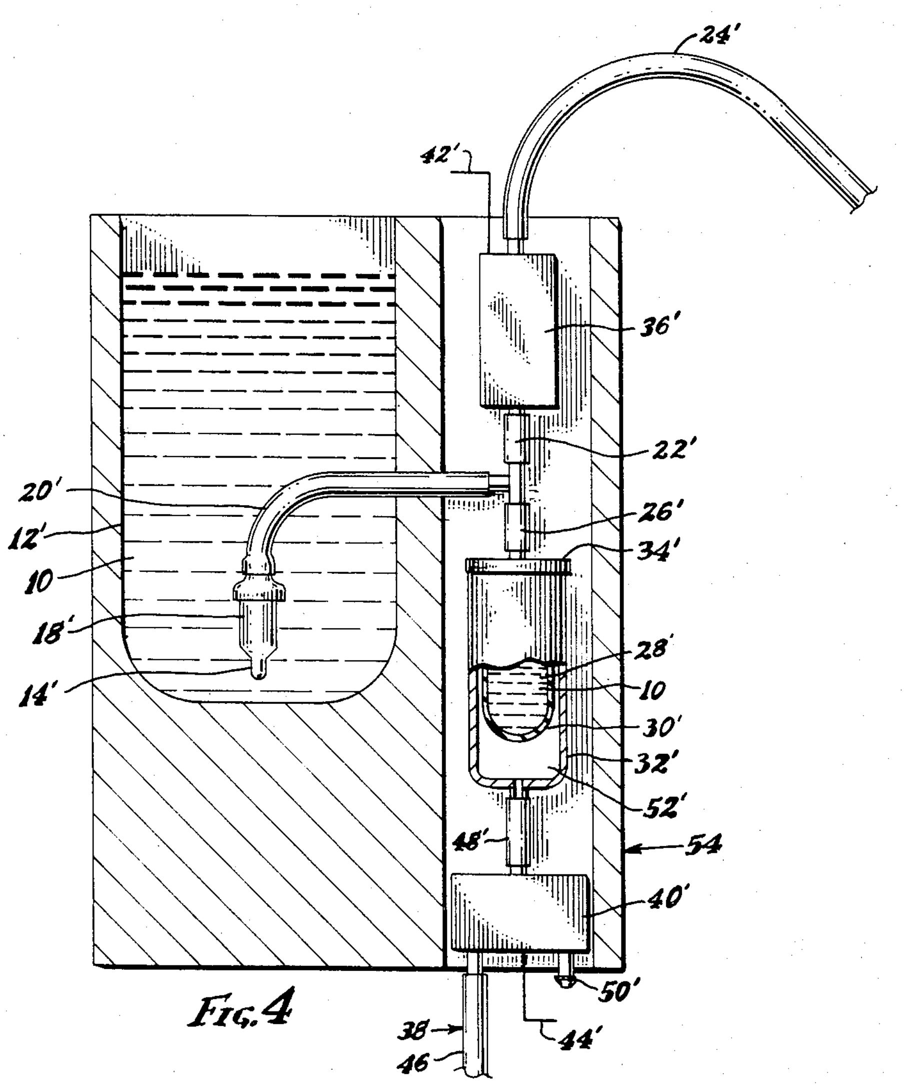
FIG. 4 illustrates an alternative embodiment in which all the operational components are integrated into a single housing or unit.

As an alternative embodiment, FIG. 4 shows how the system may be integrated into a single device or housing but with the same operative components as in the system shown in FIGS. 1, 2, and 3.

More particularly as to FIG. 4, the supply tank 12' with its check valve 18' and line 20', and the bladder housing 32' and valves 36' and 40', with their interconnected piping, are all located within an overall housing 54, only the reagent-dispensing line or conduit 24', and the air-admittance line 46 and exhaust vent 50', being shown outside the housing 54.

Figure 5:
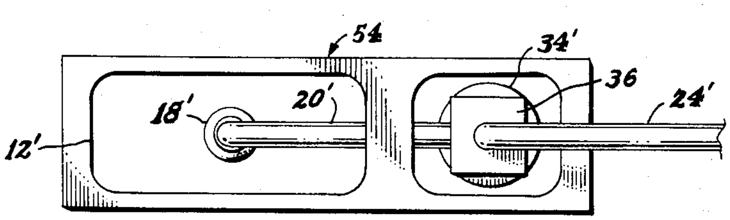
FIG. 5 is a top view of the integrated-unit embodiment of FIG. 4.

In the embodiment of FIGS. 4 and 5, although the individual components are shaped somewhat differently from those of the embodiment of FIGS. 1–3, for brevity the correspondence between the two embodiments is shown merely by the individual components having the same numerical designation, those marked with a "prime"-mark of FIGS. 4 and 5 corresponding functionally and operationally with similarly-numbered parts, not carrying a "prime"-mark, of the embodiment of FIGS. 1–3.

It is thus seen that a liquid-transfer system according to the inventive concepts, with a non-pressurized liquid supply source, as herein set forth, provides a desired and advantageous system yielding the advantages of ease of precise metering yet avoiding disadvantages of a pressurized liquid supply.

Accordingly, it will thus be seen from the foregoing description of the invention according to these illustrative embodiments, considered with the accompanying drawings, that the present invention provides new and useful combination concepts of a novel and advantageous liquid-transfer system as for metered dispensing of reagent liquids, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A liquid-transfer system, for dispensing predetermined metered amounts of liquid from a supply chamber to and out of a dispenser outlet, the system comprising:

a supply chamber which is kept open to atmospheric pressure, a liquid-inlet line extending into the supply chamber, a check valve means in the liquid-inlet line, permitting liquid flow in only a dispensing direction, a dispenser outlet means, a pumping means comprising a pumping chamber operatively on one side of a deformable bladder means mounted in a housing body, the other side of the bladder means being open to an actuation air means, the actuation air means operatively communicating with a source of air under pressure for achieving a pumping-stroke actuation of the bladder means, with associated control means for the actuation air means, and a valve means in the dispenser outlet means, with associated control means for said dispenser outlet means valve means, the liquid inlet line communicating with the pumping chamber and the dispenser outlet means, the air actuation means and the dispenser outlet means valve means, and their respective associated control means, being operable to achieve a pumping operativity of the pumping means and a separate control of the dispensing of predetermined metered amounts of liquid through the dispenser outlet means, whereby optionally-selected amounts of liquid can be dispensed by controlling the length of time during which the dispenser outlet means valve means is in a setting such that there is open communication between the pumping chamber and the despenser outlet means, the associated control means for the actuation air means and the associated control means for the dispenser outlet means valve means being co-ordinated so that the time interval during which there is open communication between the pumping chamber and the dispenser outlet means is shorter than and occurs during the time interval during which the pumping chamber is under pressure of actuating air, whereby the predetermined amount of liquid dispensed, at any given pressure exerted upon the pumping chamber, is a function of the time during which the dispenser outlet means valve means provides communication between the pumping chamber and the dispenser outlet means even though the supply chamber is of non-pressurized nature.

2. The invention as set forth in claim 1 in a combination in which the deformable bladder means is of a generally-tubular shape.

3. The invention as set forth in claim 1 in a combination in which the housing body, in which the bladder means is mounted, also provides an outer wall to which the bladder means is sealingly connected, the wall of the housing body and the side of the bladder means open to the air actuation means providing a sealed chamber inside of which pressure variations achieve the pumping actuation of the bladder means and inside of which pressure is dependent upon the actuation air means.

4. The invention as set forth in claim 1 in a combination in which the dispenser outlet means valve means is a two-way valve means which in one setting provides communication from the pumping chamber to the dispenser outlet means but in another setting such communication is blocked.

5. The invention as set forth in claim 1 in a combination in which the air actuation means includes a three-way valve means, which in one setting opens to vent the pressure against the side of the bladder means open to the air actuation means, but blocks venting of the line leading from the external air pressure source, and in a second setting opens communication between the associated source of compressed air and the side of the bladder means open to the air actuation means, but blocks any venting from either line.

6. The invention as set forth in claim 4 in a combination in which the air actuation means includes a three-way valve means, which in one setting opens to vent the pressure against the side of the bladder means open to the air actuation means, but blocks venting of the line leading from the external air pressure source, and in a second setting opens communication between the associated source of compressed air and the side of the bladder means open to the air actuation means, but blocks any venting from either line.

7. The invention as set forth in claim 1 in a combination in which the liquid-inlet line branches to two lines, a first one of which leads to the pumping chamber and a second of which leads to the dispenser outlet means.

8. The invention as set forth in claim 4 in a combination in which the liquid-inlet line branches to two lines, a first one of which leads to the pumping chamber and a second of which leads to the dispenser outlet means.

9. The invention as set forth in claim 5 in a combination in which the liquid-inlet line branches to two lines, a first one of which leads to the pumping chamber and a second of which leads to the dispenser outlet means.

10. The invention as set forth in claim 6 in a combination in which the liquid-inlet line branches to two lines, a first one of which leads to the pumping chamber and a second of which leads to the dispenser outlet means.

11. A liquid-transfer system, for dispensing predetermined metered amounts of liquid from a supply chamber to and out of a dispenser outlet, the system comprising:

a supply chamber which is kept open to atmospheric pressure, a liquid-inlet line extending into the supply chamber, a check valve means in the liquid-inlet line, permitting liquid flow in only a dispensing direction, a dispenser outlet means, a pumping means comprising a pumping chamber operatively on one side of a deformable bladder means mounted in a housing body, an acutation means for achieving a pumping-stroke actuation of the bladder means, with associated control means for said actuation means, and a valve means in the dispenser outlet means, with associated control means for said dispenser outlet means valve means, the liquid inlet line communicating with the pumping chamber and the dispenser outlet means, the actuation means and the dispenser outlet means valve means, and their respective associated control means, being operable to achieve a pumping operativity of the pumping means and a separate control of the dispensing of predetermined metered amounts of liquid through the dispenser outlet means, whereby optionally-selected amounts of liquid can be dispensed by controlling the length of time during which the dispenser outlet means valve means is in a setting such that there is open communication between the pumping chamber and the dispenser outlet means, the associated control means for the actuation means and the associated control means for the dispenser outlet means valve means being co-ordinated so that the time interval during which there is open communication between the pumping chamber and the dispenser outlet means is shorter than and occurs during the time interval during which the pumping chamber is subjected to actuation by the actuation means, whereby the predetermined amount of liquid dispensed, at any given pressure exerted upon the pumping chamber, is a function of the time during which the dispenser outlet means valve means provides communication between the pumping chamber and the dispenser outlet means even though the supply chamber is of non-pressurized nature.

12. The invention as set forth in claim 11 in a combination in which the dispenser outlet means valve means is a two-way valve means which in one setting provides communication from the pumping chamber to the dispenser outlet means but in another setting such communication is blocked.

13. The invention as set forth in claim 1 in a combination in which there is provided a housing; and the supply chamber, the pumping means, and the dispenser outlet means valve means, are all provided within said housing.

14. The invention as set forth in claim 11 in a combination in which there is provided a housing; and the supply chamber, the pumping means, and the dispenser outlet means valve means, are all provided within said housing.

15. The invention as set forth in claim 12 in a combination in which there is provided a housing; and the supply chamber, the pumping means, and the dispenser outlet means valve means, are all provided within said housing.

* * * * *